United States Patent
Kong

(10) Patent No.: US 9,889,584 B2
(45) Date of Patent: Feb. 13, 2018

(54) APPARATUS AND METHOD FOR MANUFACTURING CRASH PAD

(71) Applicants: Hyundai Motor Company, Seoul (KR); Kia Motors Corporation, Seoul (KR)

(72) Inventor: Byung Seok Kong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/349,190

(22) Filed: Nov. 11, 2016

(65) Prior Publication Data

US 2017/0057132 A1 Mar. 2, 2017

Related U.S. Application Data

(62) Division of application No. 13/650,849, filed on Oct. 12, 2012, now Pat. No. 9,511,522.

(30) Foreign Application Priority Data

May 25, 2012 (KR) ........................ 10-2012-0056376

(51) Int. Cl.
*B29C 44/58* (2006.01)
*B29C 44/18* (2006.01)
(Continued)

(52) U.S. Cl.
CPC .............. *B29C 44/58* (2013.01); *B29C 33/34* (2013.01); *B29C 44/086* (2013.01);
(Continued)

(58) Field of Classification Search
CPC ... B29C 44/58; B29C 44/086; B29C 44/1238; B29C 44/18; B29C 44/0416; B29C 44/14
(Continued)

(56) References Cited

U.S. PATENT DOCUMENTS 5,753,151 A    5/1998  McBride
6,391,232 B1   5/2002  Fritsch
(Continued)

FOREIGN PATENT DOCUMENTS

CN    10108670 A    11/2007
CN    101134357 A    3/2008
(Continued)

*Primary Examiner* — Christina Johnson
*Assistant Examiner* — Xue Liu
(74) *Attorney, Agent, or Firm* — Morgan, Lewis & Bockius LLP

(57) ABSTRACT

An apparatus for manufacturing a crash pad having a foam layer by injecting and foam-molding a foam liquid between a base and a skin may include a first mold and a second mold which mold the base by injecting molten resin into a base forming space formed in a mold-closed state and a vacuum mold for vacuum-molding the skin, in which when the vacuum mold to which the formed skin may be attached may be mold-closed with the first mold, a foam space may be formed between the skin and the base of the first mold, and an injection channel for injecting the molten resin into the base forming space and a foam liquid injection channel for injecting the foam liquid into the foam space may be provided in the first mold, such that the first mold may be used as a foam mold, together with the vacuum mold.

5 Claims, 5 Drawing Sheets

BASE INJECTION AND SKIN FORMING

(51) Int. Cl.
    *B29C 44/08*    (2006.01)
    *B29C 44/12*    (2006.01)
    *B29C 33/34*    (2006.01)
    *B29C 45/04*    (2006.01)
    *B29C 45/14*    (2006.01)
    *B29C 51/10*    (2006.01)
    *B29C 51/20*    (2006.01)
    *B29C 51/36*    (2006.01)
    *B29L 31/30*    (2006.01)
    *B29K 105/04*   (2006.01)

(52) U.S. Cl.
    CPC .......... *B29C 44/1238* (2013.01); *B29C 44/18* (2013.01); *B29C 45/0416* (2013.01); *B29C 45/14* (2013.01); *B29C 51/10* (2013.01); *B29C 51/20* (2013.01); *B29C 51/36* (2013.01); *B29K 2105/04* (2013.01); *B29L 2031/3005* (2013.01)

(58) Field of Classification Search
    USPC ........................................ 264/46.8
    See application file for complete search history.

(56) References Cited

U.S. PATENT DOCUMENTS

2006/0220274 A1    10/2006    Doolet et al.
2013/0241188 A1    9/2013     Yoon et al.

FOREIGN PATENT DOCUMENTS

| CN | 101443176 A | 5/2009 |
| JP | 57-59731 A | 4/1982 |
| JP | 2004-9650 A | 1/2004 |
| JP | 2010-82842 A | 4/2010 |
| KR | 10-2004-0035170 A | 4/2004 |
| KR | 10-2011-0081457 A | 7/2011 |

MOLTEN RESIN BASE INJECTION MOLDING

SKIN VACUUM MOLDING

FOAM LAYER FORMING

APPARATUS AND METHOD FOR MANUFACTURING CRASH PAD

CROSS-REFERENCE TO RELATED APPLICATION

The present application is a Divisional of U.S. patent application Ser. No. 13/650,849, filed Oct. 12, 2012, which claims priority to Korean Patent Application No. 10-2012-0056376 filed on May 25, 2012, the entire contents of which are incorporated herein for all purposes by these references.

BACKGROUND OF THE INVENTION

Field of the Invention

The present invention relates to an apparatus and method for manufacturing a crash pad. More particularly, the present invention relates to an apparatus and method for manufacturing a crash pad, by which productivity can be improved and expenses and costs can be cut down through reduction in the number of molds and the number of processes, and deletion of manual operations, the problem of excessive loss of foam liquid due to leakage can be solved, and the degree of freedom of design of the crash pad can be improved.

Description of Related Art

Generally, a crash pad as an interior material is installed in the front indoor portion, such as a driver's seat or the seat next to the driver, to protect a passenger in the case of any car accident.

The crash pad is manufactured to have elastic cushion capability and a property of absorbing a shock of some level, while having an elegant-looking surface state, by using a foam material.

Typically, a crash pad for a vehicle includes a skin for providing an elegant-looking surface state and a core serving as a frame of the crash pad inside the skin. Between the skin and the core is interposed a foam layer, such as a polypropylene (PP) foam, polyurethane (PU) foam, etc., to provide a cushion function and a shock absorbing function.

FIGS. 1A through 1D are diagrams showing a conventional process of manufacturing a crash pad, in which a base 1 is formed by high-polymer injection molding, a skin 2 is formed by vacuum molding, and a foam layer 3 is formed by foam molding. The process will be described with reference to FIGS. 1A through 1D.

First, the base 1 is formed by low-pressure injecting a high-polymer resin material into an injection mold composed of an upper mold 12 and a lower mold 11 as in FIG. 1A. The skin 2 is inserted and pre-heated in a vacuum mold 13 of a male type and then is vacuum-adsorbed for vacuum molding as in FIG. 1B.

After a foam liquid 3a is injected onto the base 1 of the lower mold 11, a foam upper mold 14 to which the skin 2 is attached is closed, such that the skin 2 attached to the upper mold 14 is pressed and bonded onto the foam liquid 3a of the lower mold 11.

Thereafter, unnecessary edge portions (foam liquid leakage portions, etc.) of the molded skin 2 and foam layer 3 are cut together to be removed (trimming), and the edge portions of the skin 2 are urged to enclose the foam layer 3 and are adhered and fixed to the base 1 by means of an adhesive.

FIG. 2 is a cross-sectional view showing a state in which the edge portions of the skin 2 are bonded and fixed to the base 1 in the conventional process. FIG. 2 shows an enclosing process (enclosing the edge portions of the skin 2) conducted in undercut portions of edge portions of a product.

In the enclosing process, in a state where unnecessary portions formed by leakage of the foam liquid are removed, an adhesive is applied to end portions of the base 1 and the foam layer 3, and the edge portions of the skin 2 are manually adhered and fixed to the end portion of the base 1 in such a way to enclose the end portion of the foam layer 3.

However, the foregoing conventional manufacturing method has some problems as described below.

First, the base, the skin, and the foam layer have to be formed in separate molds, such that a total of three molds (upper mold and lower mold for base injection, a vacuum mold, a foam upper mold) are required, and a total of four processes including base injection, skin forming, foam molding, and cutting (and enclosing) are required, such that the number of processes is excessive.

In addition, enclosing of the skin is manually performed in the undercut portion of the edge portions of the product, and an additional process of applying an adhesive for enclosing is required.

As a result, an investment cost such as a mold cost increases, and due to a long time of the whole processing, productivity is degraded, also increasing the cost.

Moreover, the foam upper mold and lower mold are structured such that cavity edge portions are open even in their closed state.

Consequently, the foam liquid may leak through the cavity edge portions, and because the foam liquid has to be injected into a cavity space (foam cavity) whose one side is open, the foam liquid injection temperature has to be precisely maintained and controlled within a specified temperature range.

In the structure where the foam liquid may leak and the structure where the foam space is opened, the minimum thickness of the foam layer has to be designed to be a uniform thickness of a predetermined thickness (e.g., 5 mm) or more due to the early hardening of the foam liquid, which degrades the degree of freedom of design of the crash pad (the problem of open foam).

Furthermore, due to the structure where the foam liquid may leak, excessive loss of the foam liquid may occur, also increasing the cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and method for manufacturing a crash pad, by which productivity can be improved and expenses and costs can be cut down through reduction in the number of molds and the number of processes, and deletion of manual operations, the problem of excessive loss of foam liquid due to leakage can be solved, and the degree of freedom of design of the crash pad can be improved.

In an aspect of the present invention, an apparatus for manufacturing a crash pad having a foam layer by injecting and foam-molding a foam liquid between a base and a skin, may include a first mold and a second mold which mold the base by injecting molten resin into a base forming space formed in a mold-closed state of the first and second molds, and a vacuum mold for vacuum-molding the skin, wherein when the vacuum mold to which the formed skin is attached is mold-closed with the first mold, a foam space is formed between the skin and the base, and an injection channel for injecting the molten resin into the base forming space and a foam liquid injection channel for injecting the foam liquid into the foam space are provided in the first mold, such that the first mold is used as a foam mold, together with the vacuum mold.

The second mold and the vacuum mold are selectively engaged to the first mold.

A pin portion for forming a through-hole in the base is installed in a cavity inner side forming the base forming space in the second mold to allow the foam liquid supplied through the foam liquid injection channel to pass through the through-hole of the base formed by the pin portion and to be injected into the foam space in the closed state where the first mold in which the base is molded and the vacuum mold to which the skin is attached are engaged.

A mold transfer device connected to the second mold and the vacuum mold and moving the second mold and the vacuum mold to be alternately mold-closed with the first mold.

The apparatus may further include a sealing device for sealing an edge end portion of the base forming space in the mold-closed state between the first mold and the second mold and an edge end portion of the foam space in the mold-closed state between the first mold and the vacuum mold.

The sealing device may include a slide mold which is movable in the first mold to selectively seal the edge end portion of the base forming space and the edge end portion of the foam space according to a moved position thereof, and a cylinder tool engaged to the slide mold for moving the slide mold, wherein during movement of the slide mold for sealing the foam space, an edge portion of the skin attached to the vacuum mold is urged by the slide mold to closely contact an end portion of the base, thereby closing the foam space by the edge portion of the skin.

The apparatus may further include a sealing device for selectively sealing the edge end portion of the base forming space in the mold-closed state between the first mold and the second mold, and a skin adhering device for bending an edge portion of the skin attached to the vacuum mold toward the base in the mold-closed state between the first mold and the vacuum mold, and at the same time, forming, between the bent edge portion of the skin and the end portion of the base, a gap through which the foam liquid can be leaked.

The sealing device may include a slide mold movable up and down in the first mold to selectively close the edge end portion of the base forming space according to a moved position thereof, and a cylinder tool engaged to the slide mold for moving the slide mold.

The skin adhering device may include a slide mold which is horizontally movable in the first mold to bend the edge portion of the skin attached to the vacuum mold toward the base, and a cylinder tool engaged to the slide mold for moving the slide mold, wherein the slide mold may have a gap with the end portion of the base formed in the first mold in a state of being moved to bend the edge portion of the skin.

In another aspect of the present invention, a method for manufacturing a crash pad having a foam layer by injecting and foam-molding a foam liquid between a base and a skin, may include injecting molten resin into a base forming space formed in a mold-closed state between a first mold and a second mold through an injection channel formed in the first mold, thereby forming the base and at the same time, vacuum-molding the skin in a vacuum mold, separating the second mold from the first mold and then mold-closing the vacuum mold to which the vacuum-molded skin is attached with the first mold in which the base is formed, and injecting the foam liquid into a foam space between the base of the first mold and the skin of the vacuum mold through a foam liquid injection channel formed in the first mold, thereby foam-molding the foam layer.

A through-hole is formed to pass through the base by a pin portion installed in a cavity inner side of the second mold in the forming of the base, and the foam liquid supplied through the foam liquid injection channel is injected into the foam space through the through-hole of the base in the foam-molding of the foam layer.

A slide mold of a sealing device is moved in the first mold, such that the slide mold seals an edge end portion of the base forming space in the injection-molding of the base and the slide mold seals an edge end portion of the foam space in the foam-molding of the foam layer.

During movement of the slide mold for sealing the foam space, the slide mold urges an edge portion of the skin attached to the vacuum mold to closely contact an end portion of the base, thereby closing the foam space by the edge portion of the skin.

The slide mold of the sealing device is moved in the first mold to seal the edge end portion of the base forming space in the injection-molding of the base, and in the foam-molding of the foam layer, a slide mold of a skin adhering device is moved in the first mold to bend an edge portion of the skin toward the base and inject the foam liquid, such that an edge portion of the skin is adhered to an end portion of the base by the foam liquid leaked through a gap between the edge portion of the skin and the end portion of the base.

Other aspects and preferred embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
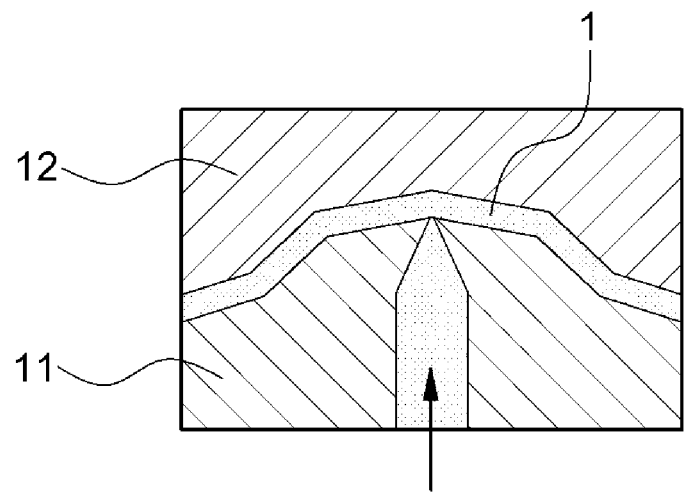
FIGS. 1A through 1D are diagrams showing a conventional process of manufacturing a crash pad.
Figure 1B:
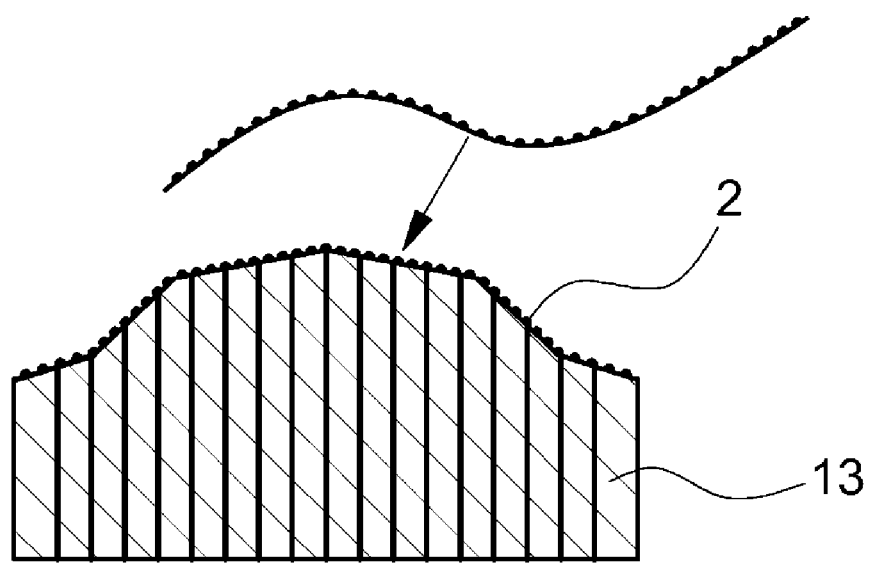
Figure 1C:
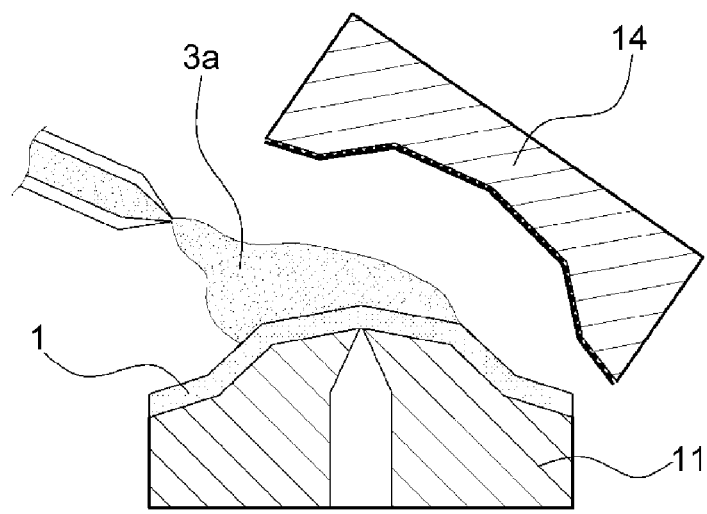
Figure 1D:
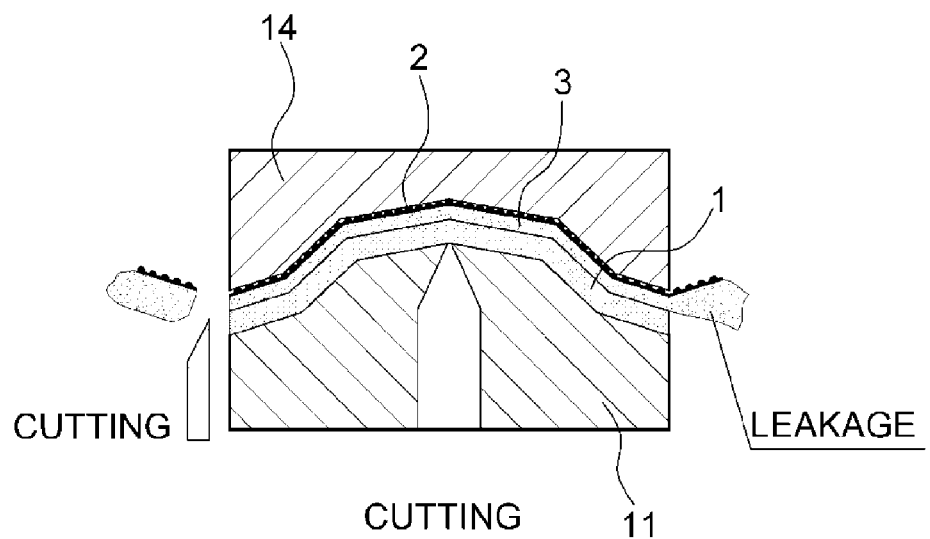
Figure 2:
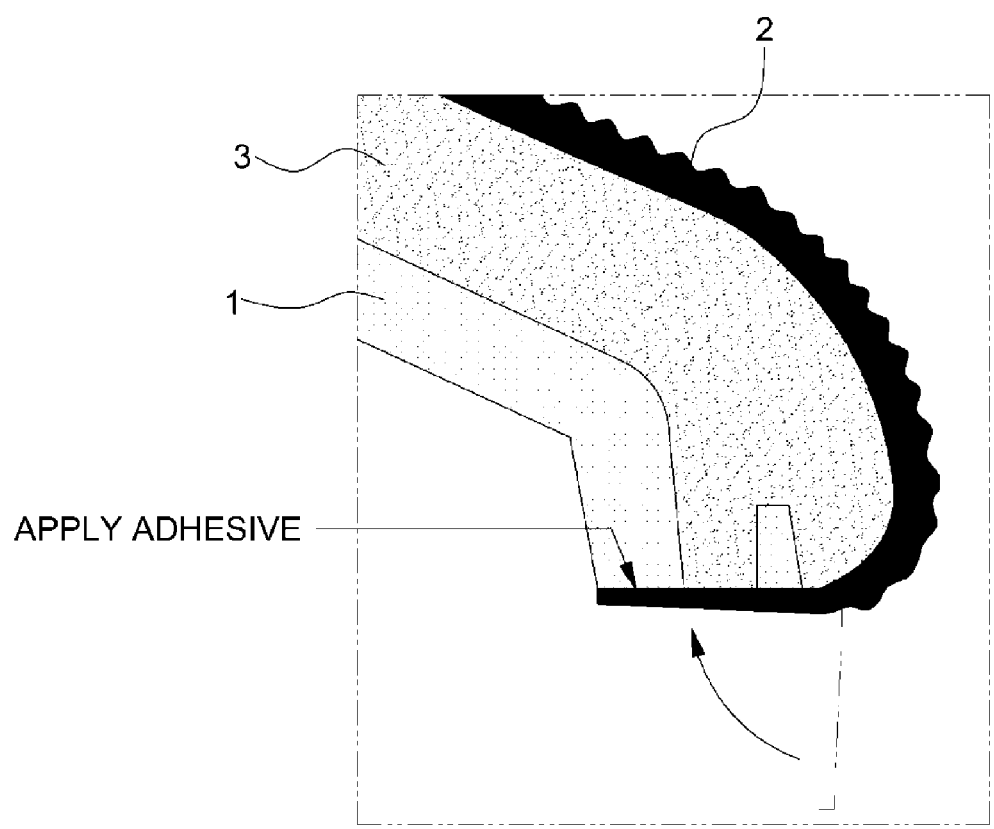
FIG. 2 is a cross-sectional view showing a state in which edge portions of a skin are bonded and fixed to a base.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings to allow those of ordinary skill in the art to easily carry out the present invention.

Figure 3A:
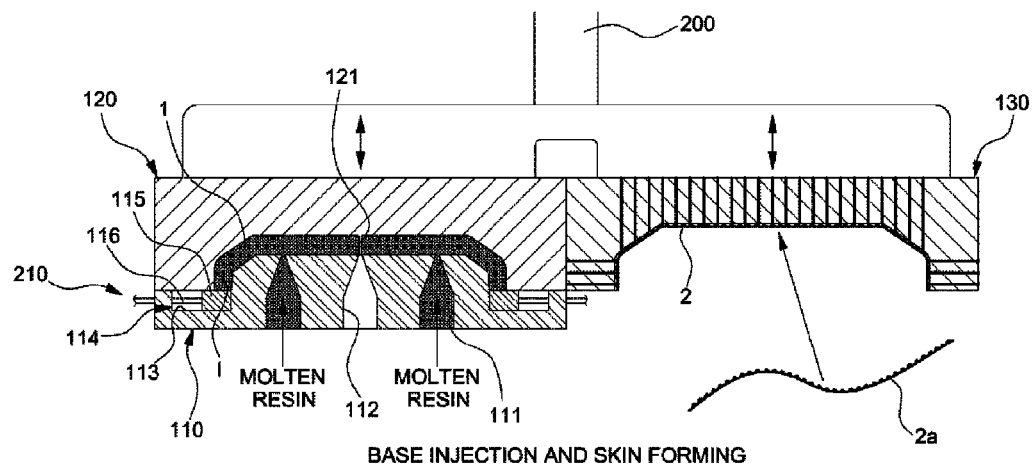
FIGS. 3A and 3B are cross-sectional views showing a structure of an apparatus for manufacturing a crash pad and a manufacturing process according to an exemplary embodiment of the present invention.
Figure 3B:
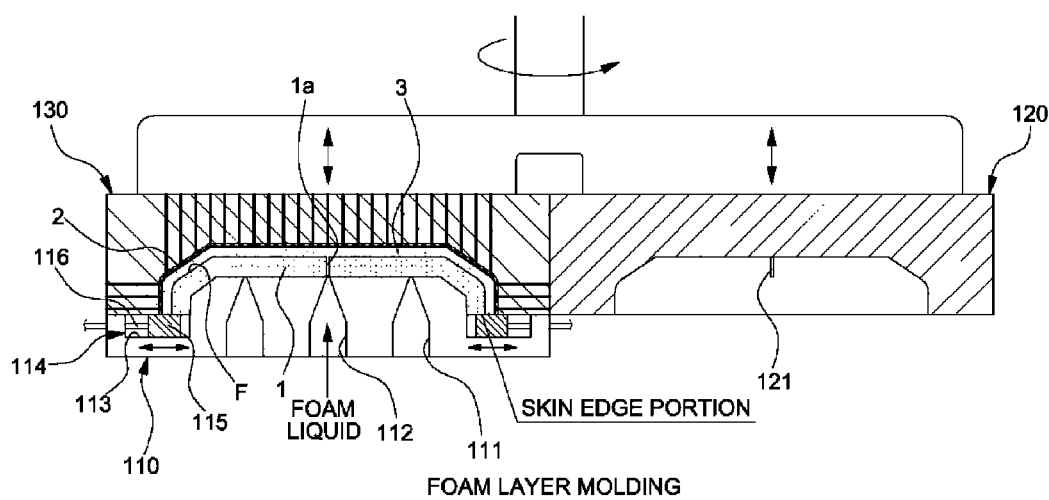

FIGS. 3A and 3B are cross-sectional views showing a structure of an apparatus for manufacturing a crash pad and a manufacturing process according to an exemplary embodiment of the present invention.

As shown in FIGS. 3A and 3B, the apparatus for manufacturing a crash pad according to an exemplary embodiment of the present invention includes a first mold 110 and a second mold 120 which are used to form the base 1 by injecting a high-polymer resin material, and a vacuum mold 130 of a female type which is used to vacuum-mold the skin 2.

Among them, the first mold 110 includes an injection channel 111 for injecting molten resin, which is a base material, into a base forming space I and a foam liquid injection channel 112 for injecting a foam liquid, which is a material of the foam layer 3, into a foam space F, such that the first mold 110 can be used as both a base injection lower mold and a foam lower mold.

The vacuum mold 130 provided as an upper mold form of a female type for vacuum molding of the skin 2 may also be used as a foam upper mold for forming an upper portion of the foam space F.

That is, in the apparatus for manufacturing a crash pad according to an exemplary embodiment of the present invention, the first mold 110 is shared as the lower mold for injection-molding the base 1 and the lower mold for foam-molding the foam layer, and a single mold is shared as the upper mold for foam-molding the foam layer 2 and the vacuum mold 130.

Unlike the first mold 110 which is the shared lower mold, the second mold 120 which is the upper mold for injection-molding the base 1 is used only for base injection.

After the base 1 and the skin 2 are formed, the vacuum mold 130 to which the skin 2 is attached and the first mold 110 to which the base 1 is attached are closed together to form a space between the skin 2 and the base 1, such that the formed space becomes the foam space F (foam layer molding space) into which the foam liquid is injected.

Thus, the apparatus for manufacturing a crash pad according to an exemplary embodiment of the present invention has a total of three molds for completely molding and manufacturing a crash pad product, one lower mold (the first mold) and two upper molds (the second mold and the vacuum mold).

On the other hand, the conventional manufacturing apparatus needs four molds for completely molding and manufacturing a crash pad product, including an upper mold and a lower mold for injection-molding a base, a male-type vacuum mold for vacuum-molding a skin, and an upper mold for foam-molding a foam layer (see FIGS. 1A through 1D).

As such, the apparatus for manufacturing a crash pad according to an exemplary embodiment of the present invention can reduce the number of molds necessary for producing a crash pad product (from four to three), thereby reducing the cost of molds, investment cost, and the cost price.

In the apparatus for manufacturing a crash pad according to an exemplary embodiment of the present invention, the first mold 110 is the same as the conventional base-injection lower mold in a sense that it has an injection channel 111, but is different therefrom in a sense that the first mold 110 also includes a foam liquid injection channel 112 through which the foam liquid supplied from a foam liquid injector can be injected into the foam space F (space between the skin 2 and the base 1) of the upper and lower molds (the first mold 110 and the vacuum mold 130) in a mold-closed state where the first mold 110 is coupled with the vacuum mold 130 also used as the foam upper mold.

Herein, the injection channel 111 of the first mold 110 is connected with an injector which heats and melts a resin material and supplies the heated and molten resin material at high pressure for base molding, and the foam liquid injection channel 112 is connected with a foam liquid injector which supplies the foam liquid. The apparatus for manufacturing a crash pad according to an exemplary embodiment of the present invention includes the injector for supplying the molten resin and the foam liquid injector for supplying the foam liquid.

The foam liquid is injected from below the formed base 1 through the foam liquid injection channel 112 provided in the first mold 110, and the injected foam liquid passes through the base 1 and is injected to the space (foam space) F formed with the skin 2 on the base 1 and is foamed. To this end, in the base 1 formed by the first mold 110 and the second mold 120 is formed a through-hole 1a for passing the foam liquid therethrough upwardly.

Therefore, to form the through-hole 1a for allowing passage of the foam liquid in the base 1, a pin portion 121 downwardly protrudes approximately to a base forming thickness in the same position as the foam liquid injection channel 112 of the first mold 110 (position corresponding to the foam liquid injection channel in the mold-closed state) in an inner side of the cavity forming an upper portion of the base forming space I in the second mold 120.

Thus, once the first mold 110 and the second mold 120 are coupled to each other in the mold-closed state, the pin portion 121 of the second mold 120 is in the position corresponding to the foam liquid injection channel 112 of the first mold 110 in the base forming space I (molds' cavity space) formed by the upper and lower molds. In this state, when the molten resin, which is the base material, is injected through the injection channel 111, the base 1 in which the through-hole 1a is formed to pass therethrough by the pin portion 121 can be formed.

The foregoing pin portion 121 of the second mold 120 is shown as being single portion in an exemplary embodiment shown in FIGS. 3A and 3B, but it may be installed as plural portions, and in this case, a plurality of through-holes may be formed in the base.

Also in that case, the same number of foam liquid injection paths as the pin portions and the through-holes of the base should be provided in the first mold to simultaneously inject the foam liquid through the respective through-holes of the base.

The structure of the second mold 120 is the same as the conventional base injection upper mold except for the pin portion 121, and basically has on the bottom thereof a cavity forming the upper portion of the base forming space I.

In the apparatus for manufacturing a crash pad according to an exemplary embodiment of the present invention, the vacuum mold 130 is different from the conventional structure (see FIGS. 1A through 1D) in that it is provided as a female-type mold, but its basic structure such as vacuum holes for vacuum-adsorbing the skin, a structure for pre-heating and adsorbing the skin, etc., is not different from the conventional vacuum mold.

For example, the vacuum mold 130 has a pre-heating device for pre-heating the skin and is also connected with a vacuum induction device to apply an induction force provided from the vacuum induction device. Through such a series of processes, the skin is pre-heated, adsorbed, and formed.

To allow the second mold 120 and the vacuum mold 130, which are upper molds, to be alternately used for the first mold 110, that is, to allow simultaneous forming and foam-molding of the base 1 and the skin 2, the apparatus for manufacturing a crash pad according to an exemplary embodiment of the present invention includes a mold transfer device 200 which moves a mold to allow the two upper molds 120 and 130 to be used sequentially for the first mold 110.

The mold transfer device 200 is driving-controlled by a controller when the second mold 120 and the vacuum mold 130 are mounted on the mold transfer device 200, such that the second mold 120 and the vacuum mold 130 are alternately moved onto the first mold 110 according to a process, and like in a typical mold-closing operation, the corresponding mold is selectively moved down in each process to couple the corresponding mold with the first mold 110 for the mold-closed state.

For example, the mold transfer device 200 may be a rotation-type mold transfer device 200 capable of transferring two upper molds (the second mold 120 and the vacuum mold 130) along a rotation orbit and also moving up and down them, such that the mold transfer device 200 moves the two upper molds alternately according to a corresponding process to allow the corresponding mold to be in a closed state with the first mold 110.

That is, in the base injection process, the second mold 120 between the two upper molds is moved onto the first mold 110 and then is moved down to be in the closed state with the first mold 110, in the foaming process, the vacuum mold 130 to which the skin 2 is attached is moved onto the first mold 110 and then is moved down to be in the closed state with the first mold 110.

It goes without saying that upon completion of each process, the upper mold used in the process is moved up for separation and then is moved again.

The rotation-type mold transfer device 200 operating as described above is known to those of ordinary skill in the art, and thus, will not be described in detail.

When the second mold 120 is moved down to the closed position, the base forming space I formed by the second mold 120 and the first mold 110 is open rather than completely closed at a side edge portion thereof.

Therefore, the apparatus for manufacturing a crash pad according to an exemplary embodiment of the present invention includes a sealing device 114 for sealing the entire circumference of the edge end portion of the base forming space I during base injection in the closed state between the first mold 110 and the second mold 120.

The sealing device 114 seals not only the base forming space I, but also the entire circumference of the edge end portion of the foam space F during a foam process when the second mold 120 is separated and the vacuum mold 130 is coupled with the first mold 110 to be in the mold-closed state.

To this end, the sealing device 114 includes a sealing slide mold 115 which is horizontally moved to seal the edge end portion of the base forming space I and the edge end portion of the foam space F according to the arrival position, and a cylinder tool 210 for horizontally moving the slide mold 115.

The cylinder tool 210 has a piston rod 116 which horizontally moves forward and backward, and is installed in the first mold 110 to horizontally move the slide mold 115 forward and backward through forward and backward movement of the piston rod 116.

The slide mold 115 is fixedly installed in the piston rod 116 of the cylinder tool, such that as the piston rod 116 horizontally moves forward and backward during driving of the cylinder tool, the slide mold 115 also moves forward and backward integrally with the cylinder tool.

The slide mold 115 is assembled into a groove 113 formed in the top surface of the first mold 110 in such a way to horizontally move forward and backward. Since the slide mold 115 has to seal the entire circumference of the edge end portion of the base forming space I by horizontally moving forward and backward in the groove 113 of the first mold 110, the slide mold 115 may be composed of several divided mold blocks along the circumference, rather than one piece.

In this case, the divided mold blocks of the slide mold 115 are disposed longitudinally along the circumference of the edge end portion, and a plurality of cylinder tools may be provided to move each mold block forward and backward.

Although two left and right mold blocks and two piston rods 116 are shown in FIGS. 3A and 3B which show a cross-sectional structure, in the real apparatus, a more number of mold blocks may be disposed along the circumference of the edge end portion of the base forming space I to perform sealing by the respective cylinder tools.

In the sealing device 114, after the slide mold 115 is moved forward by the cylinder tool 210 in the mold-closed state between the first mold 110 and the second mold 120, the edge end portion of the base forming space I is sealed.

When the vacuum mold 130, instead of the second mold 120, is in the closed state with the first mold 110 after the slide mold 115 is moved backward by the cylinder tool, if the slide mold 115 is moved forward again by the cylinder tool, then the slide mold 115 seals the edge end portion of the foam space F formed between the vacuum mold 130 and the first mold 110.

The forward-moved position of the slide mold 115 which seals the edge end portion of the base forming space I and the forward-moved position of the slide mold 115 which seals the edge end portion of the foam space F may be different from each other. When a left-to-right or right-to-left width of the slide mold 115 is larger in FIGS. 3A and 3B, both the base forming space I and the foam space F may be sealed at the same forward-moved position.

If the forward-moved positions are different, the position of the slide mold 115 which seals the edge end portion of the base forming space I is more front than the position of the slide mold 115 which seals the edge end portion of the foam space F.

The slide mold 115, when being moved forward to seal the edge end portion of the foam space F, bends the edge portion of the skin 2 attached to the vacuum mold 130 toward the end portion of the base 1 to cause the edge portion of the skin 2 to closely contact the end portion of the base 1, such that the entire foam space F is sealed by the skin edge portion closely contacting the end portion of the base during foaming.

The foam liquid is injected into such a sealed foam space F, and thus the edge portion of the skin 2 bent by the slide mold 115 is bonded and fixed to the end portion of the foam layer without any leakage, thereby automatically completing finishing of the end portion of the skin (an end enclosing process).

With reference to FIGS. 3A and 3B, a processing order will now be described.

First, as shown in FIG. 3A, in the closed state (mold-closed state) between the second mold 120 and the first mold 110, the slide mold 115 is moved forward by the cylinder tool, such that the edge end portion of the base forming space I is blocked by the slide mold 115.

As a result, the base forming space I between the upper mold and the first mold 110 is completely sealed, and in this state, molten resin supplied from the injector is injected into the base forming space I through the injection channel 111 of the first mold 110.

When the base 1 is injection-molded as described above, the skin 2 is formed in the vacuum mold 130. A skin material 2a is inserted into the vacuum mold 13 and is pre-heated, and then is vacuum-adsorbed, such that vacuum molding of the skin 2 is performed simultaneously with injection molding of the base 1.

Once the second mold 120 is moved up and opened, the vacuum mold 130 to which the skin 2 is attached is rotationally moved by the mold transfer device 200 to be replaced with the second mold 120. As shown in FIG. 3B, the vacuum mold 130 is moved onto the first mold 110 and then the vacuum mold 130 is moved down to be in the closed state (mold-closed state) with the first mold 110.

During separation of the second mold 120, the slide mold 115 is moved backward by the cylinder tool 210 to return to an initial position, and in a separated state of the second mold 120, the base 1 has the through-hole 1a formed by the pin portion 121.

When the vacuum mold 130 is closed, the slide mold 115 is moved forward by the cylinder tool 210 to block the edge end portion of the foam space F, and during forward movement of the slide mold 115, the edge portion of the skin 2 attached to the vacuum mold 130 is bent toward the base 1 on the first mold 110 such that the edge portion of the skin 2 and the slide mold 115 seals the foam space F between the skin 2 and the base 1.

Thereafter, the foam liquid supplied through the foam liquid injector is injected into the foam space F through the foam liquid injection channel 112 and the through-hole 1a of the base 1, and at the same time, it is foamed, such that the foam layer 3 is formed in which the foam space F is sealed.

In this state, once the vacuum mold 130 is moved up, the edge portion of the skin 2 is bonded and fixed to the end portion of the foam layer 3, in which molding of the crash pad is completed.

As such, the apparatus for manufacturing a crash pad according to an exemplary embodiment of the present invention injects the foam liquid into the sealed foam space, thereby controlling the temperature of the foam liquid (also improving the flow of the foam liquid) when compared to the conventional manufacturing apparatus which injects the foam liquid into the open foam space, and preventing loss of the foam liquid due to leakage (also reducing the cost).

In addition, by sealing the foam space, the foam layer can be formed to various thicknesses (e.g., the foam layer of various thicknesses in a range of 1-10 mm can be formed) with improvement in the flow of the foam liquid, and the thickness of the crash pad may be diversified from portion to portion when necessary with improvement in the degree of freedom of the foam thickness.

For example, the thickness of a portion of the crash pad with which frequency contact is made by hand may be increased, and the thicknesses of a portion with which contact is not made frequently, a non-contact portion, and matching portions (coupled portions or bonded portions) with peripheral parts may be minimized.

Consequently, the conventional manufacturing process includes four steps of base injection, skin forming, foaming, and cutting, but the manufacturing process according to an exemplary embodiment of the present invention can manufacture the crash pad through two steps including simultaneous forming of the base and the skin and simultaneous foaming and automated end enclosing, such that with reduction in the number of processing steps, all of productivity improvement, manual operation minimization, and production cost reduction are possible.

Moreover, with reduction in the number of molds, the cost of the molds, investment cost, and the cost price can be further reduced.

Figure 4:
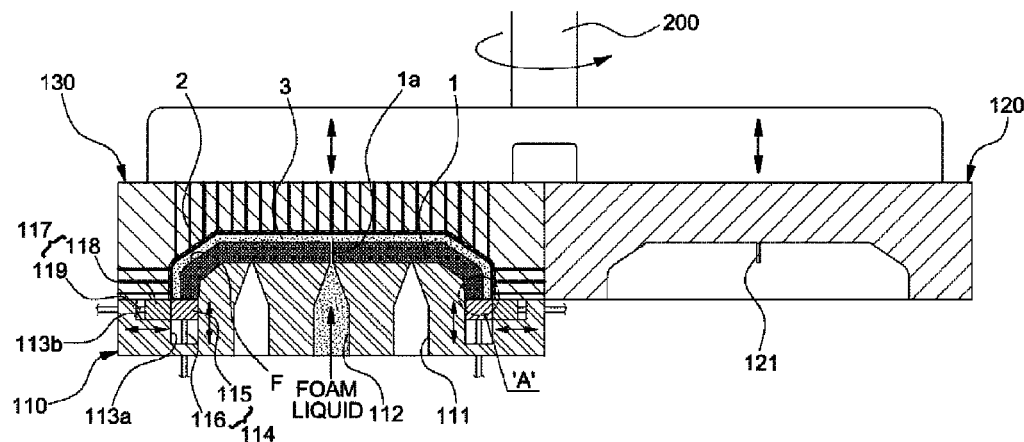
FIG. 4 is a cross-sectional view showing a structure of an apparatus for manufacturing a crash pad according to another embodiment of the present invention.

FIG. 4 is a cross-sectional view showing a structure of an apparatus for manufacturing a crash pad according to another embodiment of the present invention. In the exemplary embodiment shown in FIG. 4 when compared to the exemplary embodiment shown in FIGS. 3A and 3B, the sealing device 114 has a different structure and a skin adhering device 117 is additionally provided.

Figure 5:
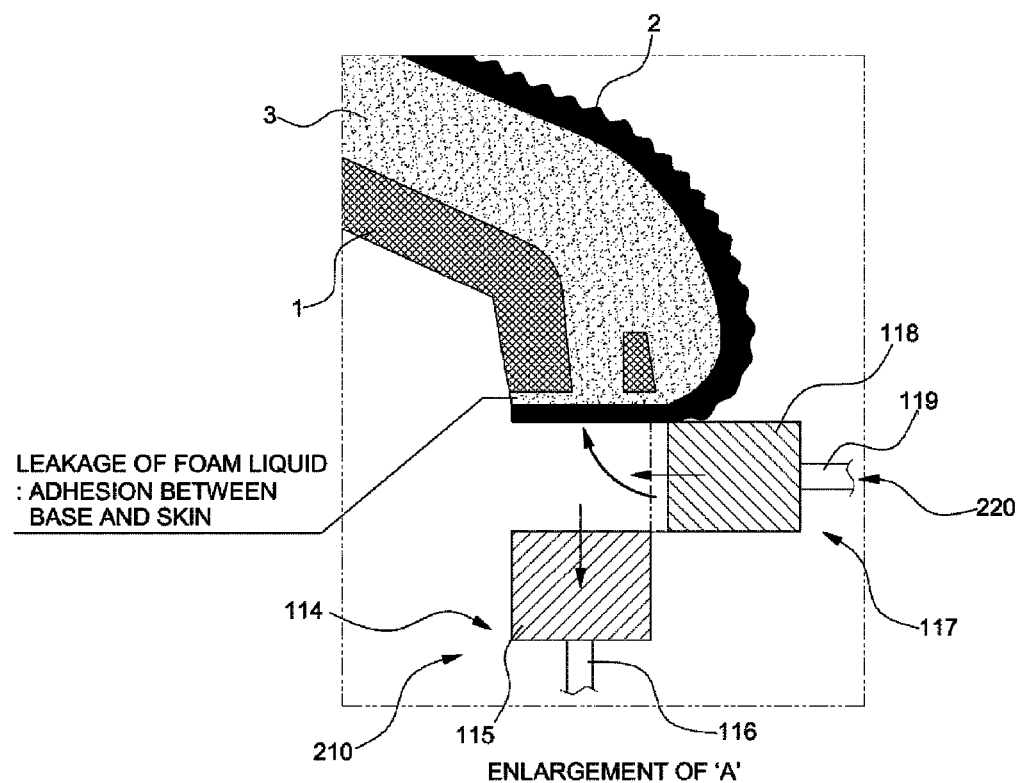
FIG. 5 is a diagram showing a state in which undercut portions of ends of edge portions of a product are automatically enclosed in an apparatus for manufacturing a crash pad shown in FIG. 4.

FIG. 5 is a diagram showing a state in which undercut portions of ends of edge portions of a product are automatically enclosed in the apparatus for manufacturing a crash pad shown in FIG. 4, in which the leakage of the foam liquid is induced in the edge end portions of the base 1 and the skin 2 to cause the skin 2 and the base 1 to be adhered to each other by the leaked foam liquid.

As is shown, the sealing device 114 which seals the base forming space I as the slide mold 115 is moved forward and backward by the cylinder tool 210 is installed in the first mold 110, but in the exemplary embodiment shown in FIG. 4, the slide mold 115 is longitudinally moved forward and backward.

That is, the sealing device 114 in which the slide mold 115 is moved longitudinally in the groove 113a of the first mold 110 by the cylinder tool 210 is installed in the first mold 110, and the slide mold 115 is installed to be longitudinally disposed along the edge end portion of the base forming space I.

The cylinder tool 210 is installed under the slide mold 115, and the slide mold 115 is coupled to the piston rod 116 of the cylinder tool, such that the piston rod 116 of the cylinder tool 210 is longitudinally moved forward and backward and thus the slide mold 115 is longitudinally moved.

In this case, the slide mold 115 may include several mold blocks divided to seal the edge end portion of the base forming space I along the entire circumference, but in the exemplary embodiment shown in FIG. 4, the slide mold 115 may be a mold which is one piece disposed longitudinally along the edge end portion of the base forming space I.

A plurality of cylinder tools may be provided, and in the mold-closed state where the second mold 120 is coupled with the first mold 110, the cylinder tools simultaneously operate in the same direction to move upward the slide mold 115, thus sealing the base forming space I, and in this state, the molten resin is injected into the base forming space I, thereby achieving injection molding of the base 1.

The skin adhering device 117 installed in the first mold 110 has the same structure as the sealing device in the exemplary embodiment shown in FIGS. 3A and 3B, such that the skin adhering device 117 includes a slide mold 118 which horizontally moves forward and backward in a groove 113b of the first mold 110 and a cylinder tool 220 which horizontally moves the slide mold 118.

After injection of the base 1 and forming of the skin 2, once the vacuum mold 130 to which the skin 2 formed to form the foam layer 3 is attached is coupled with the first mold 110, the slide mold 118 of the skin adhering device 117 is moved forward by the cylinder tool. In this state, the slide mold 118 pushes and bends the edge portion of the skin 2 attached to the vacuum mold 130 toward the base 1.

In the skin adhering device 117, the slide mold 118 in a state of being moved forward has a gap with the end portion of the base 1 previously formed in the first mold 110, as shown in FIG. 5.

That is, the slide mold 118 of the skin adhering device 117, when moved forward by the cylinder tool 220 and the piston rod 119, has a marginal gap through which the foam liquid can be leaked, rather than completely seals the edge end portion of the space (foam space) between the skin 2 and the base 1.

Thus, when the slide mold 118 is moved forward, the edge portion of the skin 2 is bent, and in this state, the foam liquid is injected and foam-molded in the foam space F, such that the foam liquid is partially leaked through a gap between the base 1 and the skin 2 and thus the base 1 and the skin 2 are adhered to each other by the leaked foam liquid.

In the exemplary embodiment shown in FIGS. 4 and 5, the leakage of the foam liquid is induced between the end portion of the base 1 and the edge portion of the skin 2, thus automatically adhering the skin 2 and the base 1 to each other, such that enclosing conventionally performed manually can be replaced with automated processing through induction of the leakage of the foam liquid.

Describing a process of forming the crash pad by using the manufacturing device of FIG. 4, first, in the mold-closed state where the second mold 120 and the first mold 110 are coupled to each other, the slide mold 115 of the sealing device 114 is moved up by the cylinder tool, thus sealing the base forming space I, and the molten resin is injected through the injection channel 111, thus achieving injection molding of the base 1.

At the same time, in the vacuum mold 130, vacuum molding of the skin 2 is performed, and upon completion of injection molding of the base 1 and vacuum molding of the skin 2, the second mold 120 is separated from the first mold 110, and in this state, the slide mold 115 of the sealing device 114 is moved down, thus being completely separated downwardly.

The vacuum mold 130 to which the formed skin 2 is attached is mold-closed with the first mold 110, and the slide mold 118 of the skin adhering device 117 is horizontally moved forward by the cylinder tool 220 and the edge portion of the skin 2 is bent toward the base 1 by the slide mold 118 (see FIG. 5).

In this case, a gap exists between the edge portion of the skin 2 and the edge end portion of the base 1, and once the foam liquid is injected into the foam space F between the skin 2 of the vacuum mold 130 and the base 1 of the first mold 110 through the foam liquid injection channel 112 and the through-hole 1a of the base 1, then the foam liquid is partially leaked to outside through that gap.

The edge portion of the skin 2 and the edge end portion of the base 1 are adhered to each other by the leaked foam liquid, such that the edge portion of the skin 2 is fixed to enclose the edge end portion of the foam layer, thereby simultaneously performing foaming and automated enclosing.

Accordingly, the apparatus and method for manufacturing a crash pad according to an exemplary embodiment of the present invention have the following advantages:

by injecting the foam liquid into the sealed foam space, the temperature of the foam liquid can be controlled in comparison to the conventional manufacturing apparatus which injects the foam liquid into the open foam space, and loss caused by the leakage of the foam liquid can be prevented (cost reduction), By sealing the foam space, the foam layer can be formed to various thicknesses with improvement in the flow of the foam liquid, and the thickness of the crash pad may be diversified from portion to portion when necessary with improvement in the degree of freedom of the foam thickness, The crash pad can be manufactured through two steps including simultaneous forming of the base and the skin and simultaneous foaming and automated end enclosing, thereby with reduction in the number of processes, improving productivity, minimizing manual operations, and reducing production cost, and With reduction in the number of molds, the cost of molds, investment cost, and the cost price can be further reduced.

For convenience in explanation and accurate definition in the appended claims, the terms "upper", "lower", "inner", "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for manufacturing a crash pad having a foam layer by injecting and foam-molding a foam liquid between a base and a skin, the method including:

injecting molten resin into a base forming space formed in a mold-closed state between a first mold and a second mold through an injection channel formed in the first mold, thereby forming the base having a through-hole for passing the foam liquid therethrough and at the same time, vacuum-molding the skin in a vacuum mold;

separating the second mold from the first mold and then mold-closing the vacuum mold to which the vacuum-molded skin is attached with the first mold in which the base is formed; and injecting the foam liquid into a foam space between the base of the first mold and the skin of the vacuum mold through a foam liquid injection channel formed in the first mold, thereby foam-molding the foam layer, wherein the through-hole is formed to pass through the base by a pin portion installed in a cavity inner side of the second mold in the forming of the base.

2. The method of claim 1, wherein the foam liquid supplied through the foam liquid injection channel is injected into the foam space through the through-hole of the base in the foam-molding of the foam layer.

3. The method of claim 1, wherein a slide mold of a sealing device is moved in the first mold, such that the slide mold seals an edge end portion of the base forming space in the injection-molding of the base and the slide mold seals an edge end portion of the foam space in the foam-molding of the foam layer.

4. The method of claim 3, wherein during movement of the slide mold for sealing the foam space, the slide mold urges an edge portion of the skin attached to the vacuum mold to closely contact an end portion of the base, thereby closing the foam space by the edge portion of the skin.

5. The method of claim 1, wherein a slide mold of the sealing device is moved in the first mold to seal the edge end portion of the base forming space in the injection-molding of the base, and in the foam-molding of the foam layer, a slide mold of a skin adhering device is moved in the first mold to bend an edge portion of the skin toward the base and inject the foam liquid, such that an edge portion of the skin is adhered to an end portion of the base by the foam liquid leaked through a gap between the edge portion of the skin and the end portion of the base.

* * * * *